United States Patent
Van Brocklin et al.

(10) Patent No.: US 7,443,772 B2
(45) Date of Patent: Oct. 28, 2008

(54) FOCUS OFFSET CALIBRATION

(75) Inventors: Andrew L Van Brocklin, Corvallis, OR (US); Darwin M. Hanks, Fort Collins, CO (US); Greg J. Lipinski, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 638 days.

(21) Appl. No.: 11/195,094

(22) Filed: Aug. 2, 2005

(65) Prior Publication Data
US 2007/0030332 A1    Feb. 8, 2007

(51) Int. Cl.
*G11B 7/00* (2006.01)

(52) U.S. Cl. .................. 369/44.26; 369/47.1

(58) Field of Classification Search ................ 369/47.1, 369/47.27, 47.28, 44.29, 44.26, 44.25
See application file for complete search history.

(56) References Cited

U.S. PATENT DOCUMENTS 7,250,974 B2 *   7/2007   Koyanagi ..................... 348/345
2004/0136279 A1   7/2004   Koll et al.

* cited by examiner

*Primary Examiner*—Nabil Z Hindi

(57) ABSTRACT

A series of signals is applied to a lens actuator of a disc media marking device to respectively position a lens at a series of distances from an optical disc. A mark is formed on the optical disc at each of the distances of the lens from the optical disc by passing a light beam through the lens and onto the optical disc. The darkest of the marks is determined. The signal applied to the actuator corresponding to the darkest mark is determined.

38 Claims, 4 Drawing Sheets

FOCUS OFFSET CALIBRATION

BACKGROUND

Optical discs, such as compact discs (CDs) and digital versatile discs (DVDs), are a form of computer-readable media that provide storage for digital information. Some optical discs may be read-only, while others may also be written to. Typically, one side of an optical disc is referred to as a data side, while the other side is referred to as a label side. The label side may include label text and/or graphics.

An optical disc drive is used to read from and, in some cases, to write to the data side of an optical disc. An optical pickup unit is included in the optical disc drive and is configured with a laser and sensors for reading from and writing to the data side. An optical pickup unit may also be configured for writing to the label side. However, writing to the label side may involve defocusing the laser (or offsetting the laser lens from the "best" focus point) to decrease labeling times. For example, a mark having about the same contrast can be printed at a faster speed by moving the lens closer to the disc than "best" focus. Problems with using focus offset include uncertainty in laser power and uncertainty in the electrical-to-mechanical gain of the focus actuator that positions the lens.

DETAILED DESCRIPTION

In the following detailed description of the present embodiments, reference is made to the accompanying drawings that form a part hereof, and in which is shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
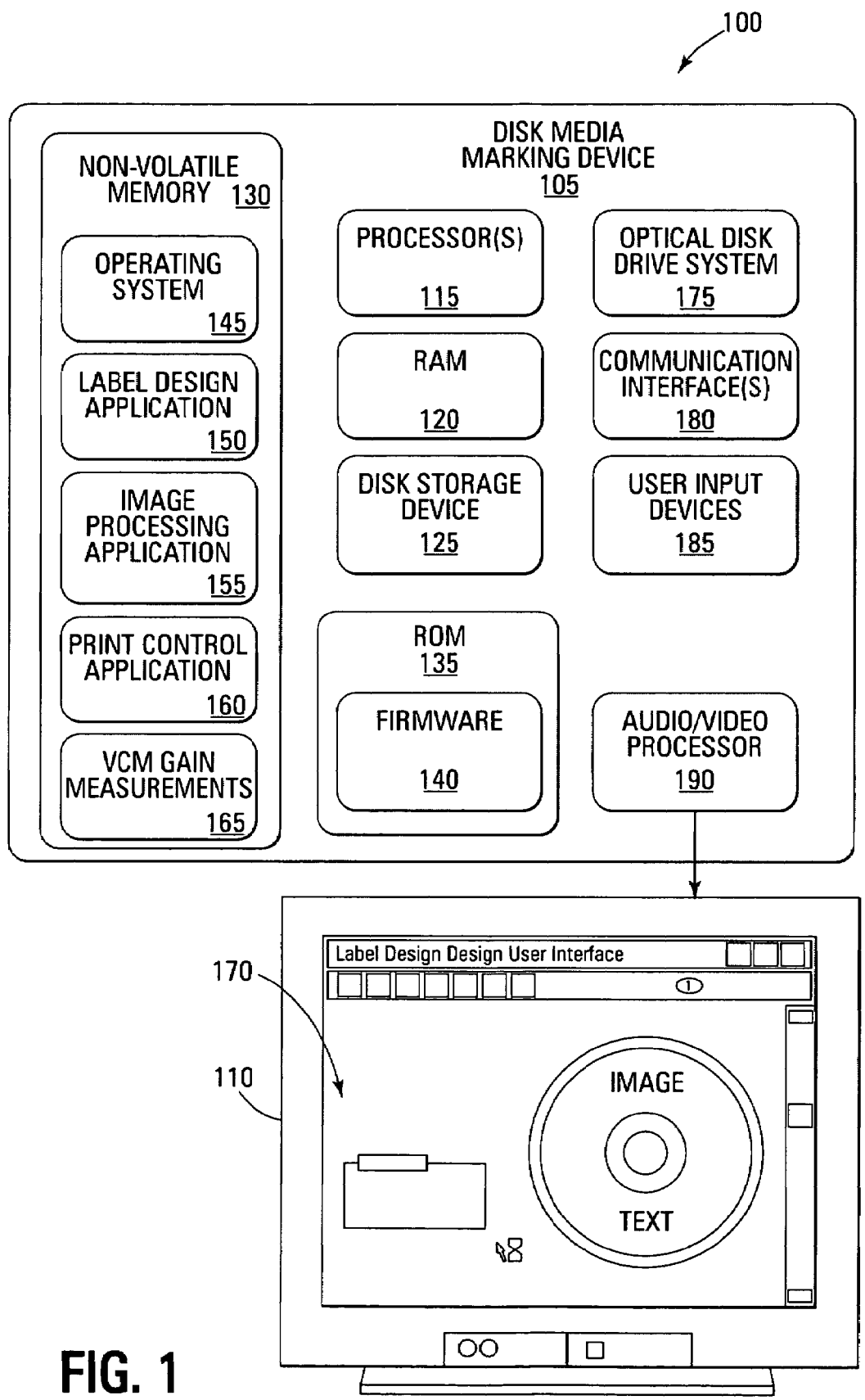
FIG. 1 is a block diagram of an embodiment of an exemplary disc media marking system, according to an embodiment of the present disclosure.

FIG. 1 shows an exemplary disc media marking system 100 suitable for measuring and calibrating input voltage values of an actuator, such as a voice coil motor (VCM), according to an embodiment. The marking system 100 includes a disc media marking device 105 and a display device 110. The disc media-marking device 105 may be implemented as a stand-alone appliance device for labeling disc media. Alternatively, the disc media marking device 105 may be integrated as part of an optical media player or drive, such as a writable compact disc (CD) player or a drive implemented to label an optical disc as well as record data onto a CDR (CD recordable disc) and/or CD-RW (CD-rewritable disc). The disc media may also be integrated as part of a digital versatile disc (DVD) player that is implemented to label an optical disc as well as record data onto a DVD-R, DVD+R, DVD-RW, DVD+RW disc, or the like.

An optical media player may be used to read from and may write to a data side of an optical disc. An optical pickup unit (OPU), included within the optical device, is configured with a laser and sensors adapted for reading and writing data. Such writable optical devices may include, for example, a stand-alone audio CD player that is a peripheral component of an audio system, a CD or DVD drive integrated as standard equipment in a PC (personal computer), a DVD (digital versatile disc) player and/or recorder, and any number of similar embodiments.

Disc media marking device 105 typically includes one or more processors 115 (e.g., any of microprocessors, controllers, and the like) that process various instructions to control the operation of disc media marking device 105 and communicate with other electronic and computing devices. Disc media marking device 105 may be implemented with one or more memory components, examples of which include a random access memory (RAM) 120, a disc storage device 125, and a computer-usable medium, such as nonvolatile memory 130, (e.g., any one or more of a read-only memory (ROM) 135, flash memory, EPROM, EEPROM, etc.).

Disc storage device 125 may include any type of magnetic or optical storage device, such as a hard disc drive, a magnetic tape, a recordable and/or rewriteable compact disc (CD), a DVD, DVD+RW, and the like. The one or more memory components provide data storage mechanisms to store various information and/or data, such as configuration information for disc media marking device 105, graphical user interface information, and any other types of information and data related to operational aspects of disc media marking device 105. Alternative implementations of disc media marking device 105 may include a range of processing and memory capabilities, and may include any number of differing memory components than those shown in FIG. 1.

Disc media marking device 105 may include a firmware component 140 that is implemented as a permanent memory module stored on ROM 135, or with other components in disc media marking device 105, such as a component of, a processor 115. Firmware 140 is programmed and distributed with disc media marking device 105 to coordinate operations of the hardware within disc media marking device 105 and contains programming constructs used to perform such operations.

An operating system 145 and one or more application programs may be stored in nonvolatile memory 130 and executed on processor(s) 115 to provide a runtime environment. A runtime environment facilitates extensibility of disc media marking device 105 by allowing various interfaces to be defined that, in turn, allow the application programs to interact with disc media marking device 105. In this example, the application programs include a label design application 150, an image processing application 155, and a print control application 160. Furthermore, it is contemplated that VCM gain measurements 165 are stored in non-volatile memory, such as nonvolatile memory 130. In certain embodiments, VCM gain measurements 165 are stored in non-volatile sections of RAM 130 or ROM 135. VCM gain measurements are inherent to the particular VCM, and specifically related to the metal used in the VCM windings and the number of windings of the VCM and the temperature at which the measurement was made.

The label design application 150 generates a label design user interface 170 for display on display device 110 from which a user may create a label image to be rendered on a disc media, such as on an optical disc. A user may specify text, a bitmap image for background, a digital photo, a graphic or symbol, and/or any combination thereof to create the label image on the user interface 170.

The image processing application 155 processes the label image created with the label design user interface 170 to produce a data stream of label image data and laser control data for labeling the image on concentric circular tracks of a disc media (i.e., an optical disc). For example, a continuous tone RGB (red, green, and blue) rectangular raster graphic of the label image may be color mapped and separated into the printing color channels KCMY (black, cyan, magenta, and yellow), or grayscale and then halftones and converted to concentric circular tracks. This data stream may be formatted as laser control data and may be augmented with other control commands to control the disc media marking device 105 rendering a label on the disc media.

A label file may be generated using image processing application 155. The label file is communicated to a controller 260 (FIG. 2) by print control application 160 that parses the label file to control a labeling mechanism. Alternatively, the concentric circular tracks may be generated and streamed to the disc media marking device 105, one track at a time for processing and labeling, through print control application 160.

The print control application 160 determines the radius from the hub of the disc of the first track, and the subsequent track spacing. After the radius of the first track and the track spacing are determined, the print control application 160 determines which label image data will correspond to each respective track. The laser mark locations along a particular track are specified in a coordinate system where the concentric circular tracks are defined in coordinates of the radial distance and the distance along each respective track.

Disc media marking device 105 includes an optical disc drive (ODD) system 175 that may be configured to produce visible marks on a surface of a disc media (i.e., optical disc), so as to produce a label image on a label surface (i.e., label side) of the optical disc. The ODD system 175 is described in greater detail herein below with reference to FIG. 2.

Disc media marking device 105 may further include one or more communication interfaces 180 that may be implemented as any one or more of a serial and/or parallel interface, as a wireless interface, any type of network interface, and as any other type of communication interface. A wireless interface enables disc media marking device 105 to receive control input commands and other information from an input device, such as a remote control device or from other infrared (IR), 802.11, Bluetooth, or similar RF input device. A network interface provides a connection between disc media marking device 105 and a data communication network to send label image data and other information to disc media marking device 105 via the network. Similarly, a serial and/or parallel interface provides a data communication path directly between disc media marking device 105 and another electronic or computing device.

Disc media marking device 105 may include user input devices 185 that may include a keyboard, pointing device, selectable controls on a user control panel, and/or other mechanisms to interact with and to input information to disc media marking device 105. Disc media marking device 105 also includes an audio/video processor 190 that generates display content for display on display device 110 and generates audio content for presentation by a presentation device, such as one or more speakers (not shown). The audio/video processor 190 may include a display controller that processes the display content to display corresponding images on display device 110. A display controller may be implemented as a graphics processor, microcontroller, integrated circuit, and/or similar video-processing component to process the images. Video signals and audio signals may be communicated from disc media marking device 105 to display device 110 via an RF (radio frequency) link, S-video link, composite video link, component video link, or other similar communication link.

Although shown separately, some of the components of disc media marking device 105 may be implemented in an application specific integrated circuit (ASIC). Additionally, a system bus (not shown) typically connects the various components within disc media marking device 105. A system bus may be implemented as one or more of any of several types of bus structures, including a memory bus or memory controller, a peripheral bus, an accelerated graphics port, or a local bus using any of a variety of bus architectures. Furthermore, disc media marking device 105 may share a system bus with a host processor.

Figure 2:
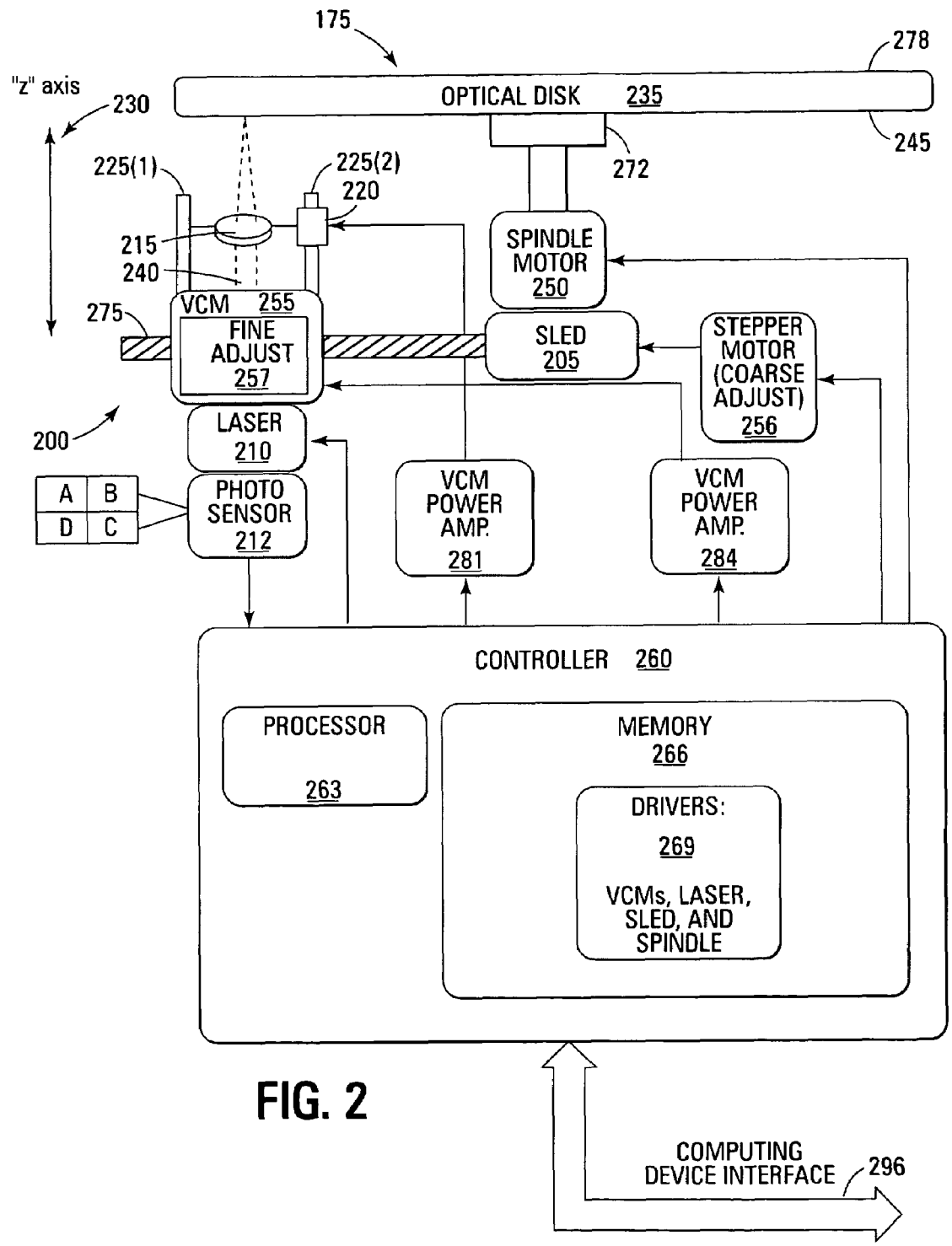
FIG. 2 is a block diagram of an exemplary embodiment of an optical disc drive system of a disc media marking system, according to another embodiment of the present disclosure.

FIG. 2 is a block diagram of an exemplary embodiment of the ODD system 175 shown in FIG. 1, according to an embodiment. The ODD system 175 includes an optical pickup unit (OPU) assembly 200 that includes a sled 205, a laser 210, a photo sensor 212, focal optics (or lens) 215 and an actuator (or voice coil motor (VCM)) 220. The VCM 220 responds to an input signal (voltage or current) to cause the lens 215 to move the focal point of a laser beam generated by laser 210.

For purposes of illustration, the lens 215 is carried by lens supports 225(1), 225(2). The lens 215 is configured for travel (i.e., adjustment of the focal point) along a z-axis 230 perpendicular to a surface of an optical disc 235. Photo sensor 212 determines a distance along z-axis 230 at which an "in focus" condition of the laser beam exists with respect to a particular location on the surface of optical disc 235. VCM 220 is calibrated to move to this particular distance by receiving a particular input signal.

However, in some embodiments, it may be desirable to further adjust the z-axis position so as to intentionally defocus the laser beam. This focus offset may be provided in order to provide a better image quality using a marking laser. For example, the size of the visible spots created by a focused laser may be too small to allow efficient labeling, so a defocused laser beam may be used to created larger visible spots. Or the marking laser may create such distortion from its heat when making a surface, as to provide a need for an adjusted focus offset. A predetermined amount of focus offset may be achieved by providing a corresponding focus offset value for the input signal.

A laser beam 240 is generated by the laser 210 and directed onto (reflected on) a label side surface 245 of optical disc 235. The laser beam 240 creates laser marks that correspond to label image data to produce an image of the label side 245 of the optical disc 235.

The ODD system 175 includes a spindle motor 250, a VCM (or sled motor) 255, and a controller 260. For one embodiment, controller 260 includes an analog-to-digital converter and a digital-to-analog converter. VCM 255 moves OPU assembly 200 adjacent to particular radial positions or tracks of optical disc 235. VCM 255 is calibrated to move to this particular distance by receiving a particular input signal.

VCM 255 may be referred to as a sled or radial VCM since it provides movement in the radial direction. VCM 255 may be calibrated for gain, i.e., input signal (e.g., milivolts) per movement (microns), such that, for example, a particular number of milivolts results in a movement in distance.

A separate stepper motor 256 provides a coarse adjustment for radial movement, and particularly is calibrated to move per a step size increment as instructed by controller 260. VCM 255 includes a fine adjust feature 257. While stepper motor 256 is calibrated to move per a step size increment, fine adjust feature 256 is calibrated to adjust to a finer increment. For example, if stepper motor 256 is calibrated for a step size of 120 microns, and fine adjust feature 256 is calibrated for a smaller increment, when 80 microns of movement is requested, stepper motor 256 moves the sled 205 by 120 microns, and fine adjust feature 256 moves the sled 205 back by 40 microns.

In general, controller 260 may be implemented as a printed circuit board employing a combination of various components discussed above with respect to the disc media marking system 100 of FIG. 1. Accordingly, controller 260 typically includes a processor 263 for processing computer/processor-readable instructions from various components stored in a computer usable medium, such as a memory 266. For other embodiments, memory 266 includes removable or non-removable optical or magnetic media.

Drivers 269, including a laser driver, sled driver, and spindle driver are stored in memory 266 and executable on processor 263. Although these components are represented in the FIG. 2 embodiment as software components stored in memory 266 and executable on processor 263, they may also be implemented as firmware or hardware components.

In general, a spindle driver drives the spindle motor 250 to control a rotational speed of optical disc 235 via a spindle 272. The spindle driver operates in conjunction with a sled diver that drives the VCM 255 to control radial (track) positioning of OPU assembly 200 with respect to disc 235 along a sled drive mechanism 275. In a labeling implementation, the sled 205 of the OPU assembly 200 is moved along the sled drive mechanism 275 to various radii (track) positions of optical disc 235.

In a labeling implementation, the rotational speed of disc 235 and the radial position of OPU assembly 200 are controlled such that laser marks are written at desired positions on the disc 235 as the label side surface 245 moves past the laser beam 240.

A laser driver controls the activation and intensity of laser beam 240 to write laser marks corresponding to a label image onto the label side surface 245. Additionally, the laser driver controls the activation and intensity of the laser beam 240 to read data maintained on the data side 278 of the optical disc 235 when the disc is positioned such that the data side 278 passes over the laser beam 240. In certain cases, the same side is used for data and labeling.

A driver for VCM 220 is included among the drivers 269. The VCM driver is executable on processor 263 to adjust a VCM power amplifier 281 that provides an input to VCM 220. Furthermore, another driver is included for VCM 255 executable on processor 263 to adjust a VCM power amplifier 284 that provides an input to VCM 255. Input signals may be either current or voltage. As discussed, VCMs 220 and 255 may be calibrated at a particular operating temperature, for one embodiment. Therefore, input signals are based on the particular calibrated operating temperature. However, operating the OPU assembly at temperatures other than the calibrated operating temperature may result in different distances from the VCMs 220 and 255.

Computing device interface 296 interfaces the controller 260 of the ODD system 175 with another electronic or computing device to receive label image data or a label file (not shown). The computing device interface 296 can be implemented as an ATAPI (Advanced Technology Attachment Packet Interface) that is one of many small computer parallel or serial device interfaces. Another common computer interface is SCSI (small computer system interface) that is a generalized device interface for attaching peripheral devices to computers. SCSI defines the structure of commands the way commands are executed and the way status is processed. Various other physical interfaces include the Parallel Interface, Fiber Channel, IEEE 1394. USB (Universal Serial Bus), and ATNATAPI. ATAP1 is a command execution protocol for use on an ATA interface so that CDROM and tape drives can be connected via the same ATA cable with an ATA hard disc drive. ATAPI devices generally include CDROM drives, CD-recordable drives, CD-rewritable drives, DVD (digital versatile disc) drives, tape drives, super floppy drives (e.g., ZIP and LSIZO), and the like.

Photo sensor 212 provides laser focus feedback to the laser driver. For one embodiment, photo sensor 212 is an astigmatic sensor and includes four sensor quadrants: quadrants A, B, C, and D, as shown in FIG. 2. Quadrants A, B, C, and D are configured to measure reflected light from optical disc 235 after passing through lens 215 independent of each other. In particular, light intensity is measured by the quadrants A, B, C, and D.

Figure 3:
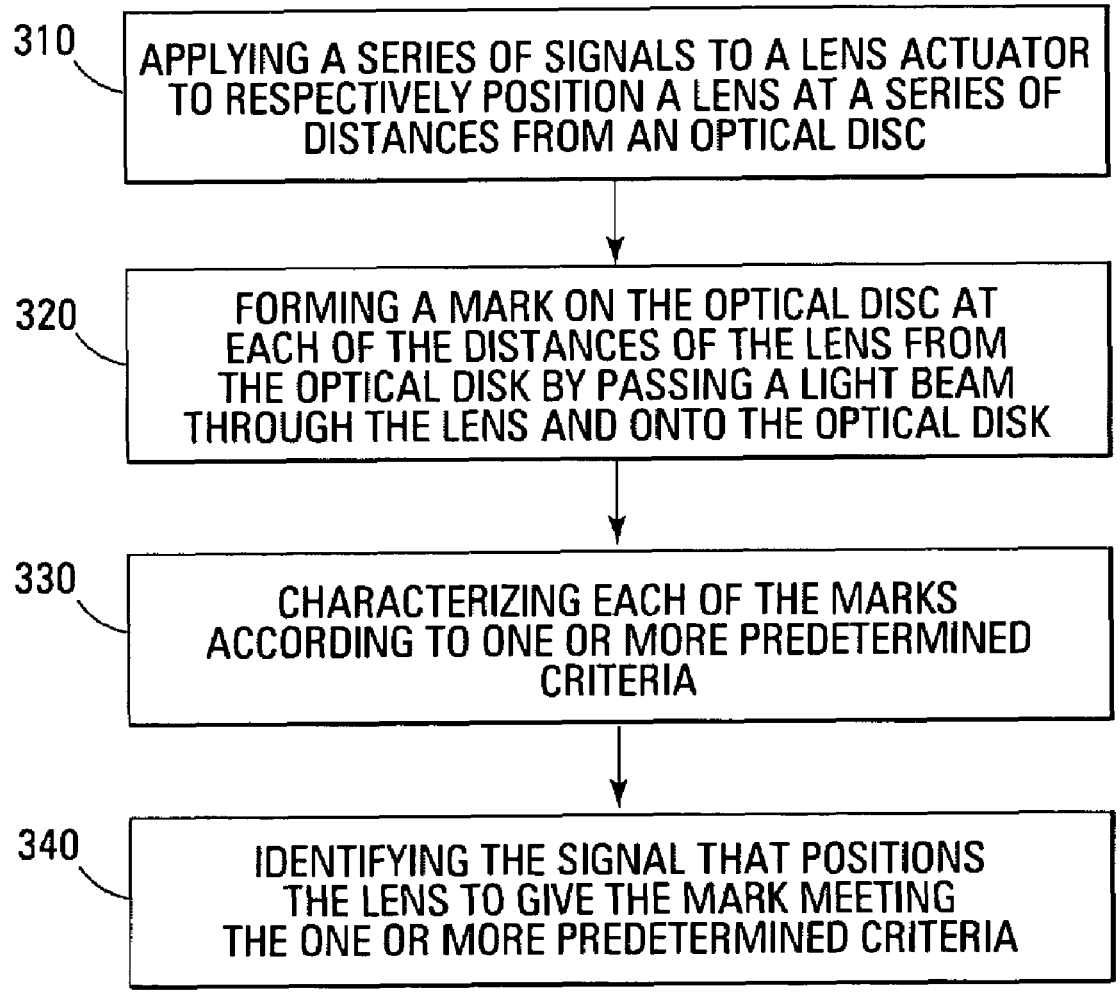
FIG. 3 is a flow chart of an embodiment of a method for calibrating a focus offset, according to an embodiment of the present disclosure.

FIG. 3 is a flow chart of a method 300 for calibrating a focus offset, according to an embodiment. At block 310, VCM power amplifier 281 inputs a signal (voltage or current) to VCM 220 to move lens 215 from a first location, e.g., the focus location or location on the z-axis that places the laser beam in focus, to a second location. This is repeated for a series of signals that respectively position lens 215 at a series of distances (or offsets) from the focus location and thus from optical disc 235. For one embodiment, a signal is input to VCM 220 signal to move lens 215 to the focus location. For another embodiment, the value of this signal is determined by measuring the value of the signal that keeps the lens at the focus location for the entire surface of optical disc 235.

Figure 4A:
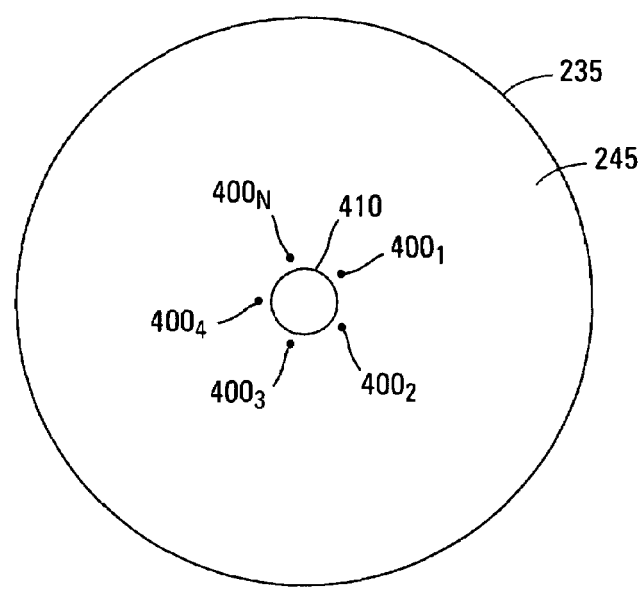
FIG. 4A illustrates an embodiment of an optical disc with marks formed thereon, according to an embodiment of the present disclosure.

At block 320, for each of the focus offsets d, a light beam, e.g., from laser 210, is passed through lens 215 and onto optical disc 235 for making a mark 400 on the label side surface 245 of optical disc 235, as shown in FIG. 4A. For one embodiment, each of marks 400 is made adjacent the inner diameter 410 of optical disc 235, as shown in FIG. 4A. Note that an offset d=0 corresponds to the focus location, offsets of d>0 correspond to distances along z-axis 230 that are further away from optical disc 235 than the focus location, and offsets of d<0 correspond to distances along z-axis 230 that are closer to optical disc 235 than the focus location.

Figure 4B:
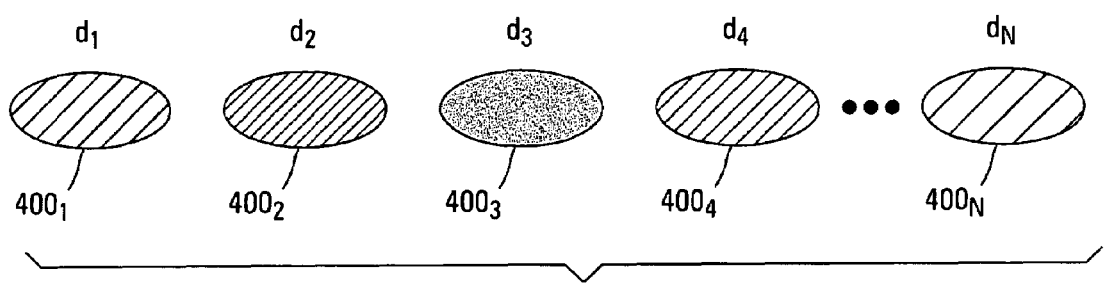
FIG. 4B is a detailed illustration of each of the marks of FIG. 4A at different focus offsets, according to an embodiment of the present disclosure.

FIG. 4B is a detailed illustration of each of the marks 400 at different focus offsets $d_1$-$d_N$. Note that each of the marks 400 has a different darkness or reflectivity. Specifically, mark $400_2$ is darker (or has a lower reflectivity than) mark $400_1$; mark $400_3$ is darker than mark $400_2$ and mark $400_4$; etc. For one embodiment, marks 400 are made at offsets d from about −100 microns to about +20 microns at a preselected laser power and a preselected linear velocity of sled 205 in the radial direction. For other embodiments, additional marks 400 may be made at other linear velocities of sled 205 and/or other laser powers. For one embodiment, the power is set before moving lens 215 to the various focus offsets and for another embodiment the power is set when the lens is at the focus location.

At block 330, each of the marks 400 is characterized according to one or more predetermined criteria, such as mark reflectivity, mark width (or track width), or a combination of mark reflectivity and mark width. For one embodiment, mark darkness and mark width are combined in the following equation that gives the difference between the reflectivity of a mark and reflectivity of the optical disc:

$$\Delta L^* = 1 - \{(T_{width}/T_{pitch})R_{mark} - (T_{pitch} - T_{width})R_{disc}/T_{pitch}\} \quad (1)$$

where $T_{pitch}$ is the track pitch (i.e., the distance between centers of adjacent tracks, $T_{width}$ is the track (or mark) width, $R_{mark}$ is the mark reflectivity, and $R_{disc}$ is the reflectivity of the optical disc material. For another embodiment, a reflectivity sensor is used to determine $R_{mark}$ and $R_{disc}$. The reflectivity sensor can also be used to measure $T_{width}$ by scanning over the width of the mark and noting where the reflectivity changes, e.g., by 50 percent. For other embodiments, a sensor may be used that measures $\Delta L^*$ directly. A Spectrolino available from Gretag-Macbeth AG (Regensdorf, CH) is an example of a suitable sensor for measuring $\Delta L^*$ directly. Note that mark reflectivity, mark width, and/or $\Delta L^*$ may be obtained for marks printed at other laser powers and linear velocities of sled 205.

At block 340 the signal that gives the offset that produces the mark meeting the one or more predetermined criteria is identified. The mark meeting the one or more predetermined criteria may be the darkest mark in terms of the widest mark, the mark having the lowest reflectivity, and/or a $\Delta L^*$ having the largest negative value.

For another embodiment, method 300 may be performed for several linear velocities of the sled 205 and/or laser powers for identifying the signal that meets the one or more predetermined criteria, e.g., the darkest mark, at each linear velocity and/or laser power. For another embodiment, this enables interpolation between the linear velocities and/or laser powers for which method 300 was performed for selecting the signal giving the darkest mark at virtually any linear velocity and/or laser power.

CONCLUSION

Although specific embodiments have been illustrated and described herein it is manifestly intended that the scope of the claimed subject matter be limited only by the following claims and equivalents thereof.

What is claimed is:

1. A method of operating a disc media marking device, comprising:
   applying a series of signals to a lens actuator of the disc media marking device to respectively position a lens at a series of distances from an optical disc;
   forming a mark on the optical disc at each of the distances of the lens from the optical disc by passing a light beam through the lens and onto the optical disc;
   determining which of the marks is the darkest; and
   identifying the signal applied to the actuator corresponding to the darkest mark.

2. The method of claim 1, wherein determining which of the marks is the darkest comprises determining which of the marks is the widest in a radial direction of the optical disc or has the lowest reflectivity or both.

3. The method of claim 1 further comprises setting a power of the light beam before applying the series of signals to the lens actuator.

4. The method of claim 3, wherein the power of the light beam is set with the lens positioned at a focus location.

5. The method of claim 1 further comprises setting a velocity at which the light beam travels in a radial direction over the optical disc before forming the marks on the optical disc.

6. The method of claim 1 further comprises moving the lens to a focus location before applying each of the series of signals to the lens actuator.

7. The method of claim 1, wherein determining which of the marks is the darkest comprises using a reflectivity sensor.

8. The method of claim 1, wherein determining which of the marks is the darkest comprises determining a difference between a reflectivity of the optical disc and each mark.

9. The method of claim 1, wherein the method is performed for each of a plurality of velocities at which the light beam travels in a radial direction over the optical disc.

10. The method of claim 9, wherein each of the plurality of velocities is a first velocity and identifying the signal applied to the actuator corresponding to the darkest mark corresponds to identifying a first signal at each of the first velocities corresponding to a first darkest mark at each of the first velocities, and wherein identifying the signal applied to the actuator corresponding to the darkest mark further comprises identifying a second signal for a second velocity corresponding to a second darkest mark by interpolating between the first velocities and their corresponding first darkest marks.

11. A method of calibrating a focus offset for a disc media marking device, comprising applying a first signal to a lens actuator of the disc media marking device to move a lens to a focus location;
   applying a series of second signals to the lens actuator to respectively position the lens at a series of offset distances from the focus location;
   forming a mark on an optical disc at each of the offset distances by passing a light beam through the lens and onto the optical disc;
   determining which of the marks is the darkest; and
   identifying the second signal applied to the actuator corresponding to the darkest mark.

12. The method of claim 11, wherein determining which of the marks is the darkest comprises determining which of the marks is the widest in a radial direction of the optical disc or has the lowest reflectivity or both.

13. The method of claim 11 further comprises setting a power of the light beam when the lens is at the focus location.

14. The method of claim 11 further comprises setting a velocity at which the light beam travels in radial direction over the optical disc before forming the marks on the optical disc.

15. The method of claim 11, wherein determining which of the marks is the darkest comprises determining a difference between a reflectivity of the optical disc and each mark.

16. The method of claim 11, wherein the method is performed for each of a plurality velocities at which the light beam travels in a radial direction over the optical disc.

17. An optical disc drive comprising:
   a means for applying a series of signals to a lens actuator of the optical disc drive to respectively position a lens at a series of distances from an optical disc;
   a means for forming a mark on the optical disc at each of the distances of the lens from the optical disc by passing a light beam through the lens and onto the optical disc;
   a means for determining which of the marks is the darkest; and
   a means for identifying the signal applied to the actuator corresponding to the darkest mark.

18. The optical disc drive of claim 17, wherein the means for determining which of the marks is the darkest comprises a means for determining which of the marks is the widest in a radial direction of the optical disc and/or has the lowest reflectivity.

19. The optical disc drive of claim 17, wherein the means for determining which of the marks is the darkest comprises a means for determining a difference between a reflectivity of the optical disc and the each mark.

20. An optical disc drive comprising:
a lens actuator;
a lens connected to the lens actuator;
a light source; and
a controller electrically coupled to the lens actuator, the controller adapted to cause the optical disc drive to perform a method comprising:
applying a series of signals to the lens actuator to respectively position the lens at a series of distances from an optical disc;
forming a mark on the optical disc at each of the distances of the lens from the optical disc by directing a light beam from the light source through the lens and onto the optical disc;
determining which of the marks is the darkest; and
identifying the signal applied to the actuator corresponding to the darkest mark.

21. The optical disc drive of claim 20, wherein, in the method, determining which of the marks is the darkest comprises determining which of the marks is the widest in a radial direction of the optical disc and/or has the lowest reflectivity.

22. The optical disc drive of claim 20, wherein the method further comprises setting a power of the light source before applying the series of signals to the lens actuator.

23. The optical disc drive of claim 22, wherein, in the method, the power is set with the lens positioned at a focus location.

24. The optical disc drive of claim 20, wherein the method further comprises setting a velocity of a sled carrying the light source to move the light beam in a radial direction over the optical disc before forming the marks on the optical disc.

25. The optical disc drive of claim 20, wherein the method further comprises moving the lens to a focus location before applying each of the series of signals to the lens actuator.

26. The optical disc drive of claim 20, wherein, in the method, determining which of the marks is the darkest comprises using a reflectivity sensor.

27. The optical disc drive of claim 20, wherein, in the method, determining which of the marks is the darkest comprises determining a difference between a reflectivity of the optical disc and each mark.

28. The optical disc drive of claim 20, wherein, the method is performed for each of a plurality of velocities at which the light beam travels in a radial direction over the optical disc.

29. The optical disc drive of claim 28, wherein, in the method, each of the plurality of velocities is a first velocity and identifying the signal applied to the actuator corresponding to the darkest mark corresponds to identifying a first signal at each of the first velocities corresponding to a first darkest mark at each of the first velocities, and wherein identifying the signal applied to the actuator corresponding to the darkest mark further comprises identifying a second signal for a second velocity corresponding to a second darkest mark by interpolating between the first velocities and their corresponding first darkest marks.

30. A computer-usable medium containing computer-readable instructions for causing an optical disc drive to perform a method comprising:
applying a series of signals to a lens actuator of the optical disc drive to respectively position a lens at a series of distances from an optical disc;
forming a mark on the optical disc at each of the distances of the lens from the optical disc by passing a light beam through the lens and onto the optical disc;
determining which of the marks is the darkest; and
identifying the signal applied to the actuator corresponding to the darkest mark.

31. The computer usable medium of claim 30, wherein, in the method, determining which of the marks is the darkest comprises determining which of the marks is the widest in a radial direction of the optical disc and/or has the lowest reflectivity.

32. The computer usable medium of claim 30, wherein the method further comprises setting a power of the light beam before applying the series of signals to the lens actuator.

33. The computer usable medium of claim 32, wherein, in the method, the power of the light beam is set with the lens positioned at a focus location.

34. The computer usable medium of claim 30, wherein the method further comprises setting a velocity at which the light beam travels in a radial direction over the optical disc before forming the marks on the optical disc.

35. The computer usable medium of claim 30, wherein the method further comprises moving the lens to a focus location before applying each of the series of signals to the lens actuator.

36. The computer usable medium of claim 30, wherein, in the method, determining which of the marks is the darkest comprises determining a difference between a reflectivity of the optical disc and each mark.

37. The computer usable medium of claim 30, wherein the method is performed for each of a plurality of velocities at which the light beam travels in a radial direction over the optical disc.

38. The computer usable medium of claim 37, wherein, in the method, each of the plurality of velocities is a first velocity and identifying the signal applied to the actuator corresponding to the darkest mark corresponds to identifying a first signal at each of the first velocities corresponding to a first darkest mark at each of the first velocities, and wherein identifying the signal applied to the actuator corresponding to the darkest mark further comprises identifying a second signal for a second velocity corresponding to a second darkest mark by interpolating between the first velocities and their corresponding first darkest marks.

* * * * *